United States Patent [19]
Nelson

[11] 3,814,353
[45] June 4, 1974

[54] BALLOON REEFING SLEEVE AND LAUNCHING METHOD
[75] Inventor: Jean R. Nelson, St. Paul, Minn.
[73] Assignee: Winzen Research Inc., St. Paul, Minn.
[22] Filed: Jan. 5, 1973
[21] Appl. No.: 321,238

[52] U.S. Cl. .................................. 244/98, 244/31
[51] Int. Cl. ............................................. B64b 1/58
[58] Field of Search ......... 244/31, 32, 33, 147, 148, 244/DIG. 1, 98; 114/102, 104, 105, 106, 107, 108; 9/11 A, 316; 24/205.19; 46/87

[56] References Cited
UNITED STATES PATENTS

| | | | |
|---|---|---|---|
| 777,973 | 12/1904 | Perlich | 24/205.19 |
| 2,635,835 | 4/1953 | Dungan et al. | 244/31 |
| 2,764,369 | 9/1956 | Melton | 244/31 |
| 2,774,979 | 12/1956 | Moran | 9/316 |
| 2,783,002 | 2/1957 | Ney et al. | 244/31 |
| 2,954,187 | 9/1960 | Winzen | 244/31 |
| 3,063,656 | 11/1962 | Bahl et al. | 244/31 |
| 3,081,967 | 3/1963 | Church | 244/31 |
| 3,093,351 | 6/1963 | Ney et al. | 244/98 |
| 3,450,377 | 6/1969 | Mitchell | 244/DIG. 1 |

Primary Examiner—Duane A. Reger
Assistant Examiner—Galen L. Barefoot
Attorney, Agent, or Firm—Carlsen, Carlsen & Sturm

[57] ABSTRACT

A method is described for launching high altitude research balloons which are often from about 300 – 500 feet in length. The balloon is extended on the ground its full length with its envelope restrained to a collapsed condition along its entire length except for a portion near the top. The restriction in the circumference of the balloon along its length causes the inflation gas to expand only the unrestricted portion of the top of the balloon to define a lifting bubble for elevating the entire balloon to an erect position while the bottom is secured to the ground. The balloon is filled from the top through a filling tube which runs along the length of the balloon. The restraint is then released beginning from the top and proceeding toward the base of the balloon as the inflation gas is introduced and in timed relationship with the introduction of the inflation gas so that the tension exerted upon the envelope of the balloon by the inflation gas will never exceed a predetermined limit during the filling operation and the portion of the balloon envelope below the expanding bubble will remain restricted to a substantially uninflated condition because of the continued circumferential restraint thereof. The restrained portion is reduced in size progressively proceeding downwardly until the balloon is sufficiently inflated for release from the ground.

10 Claims, 10 Drawing Figures

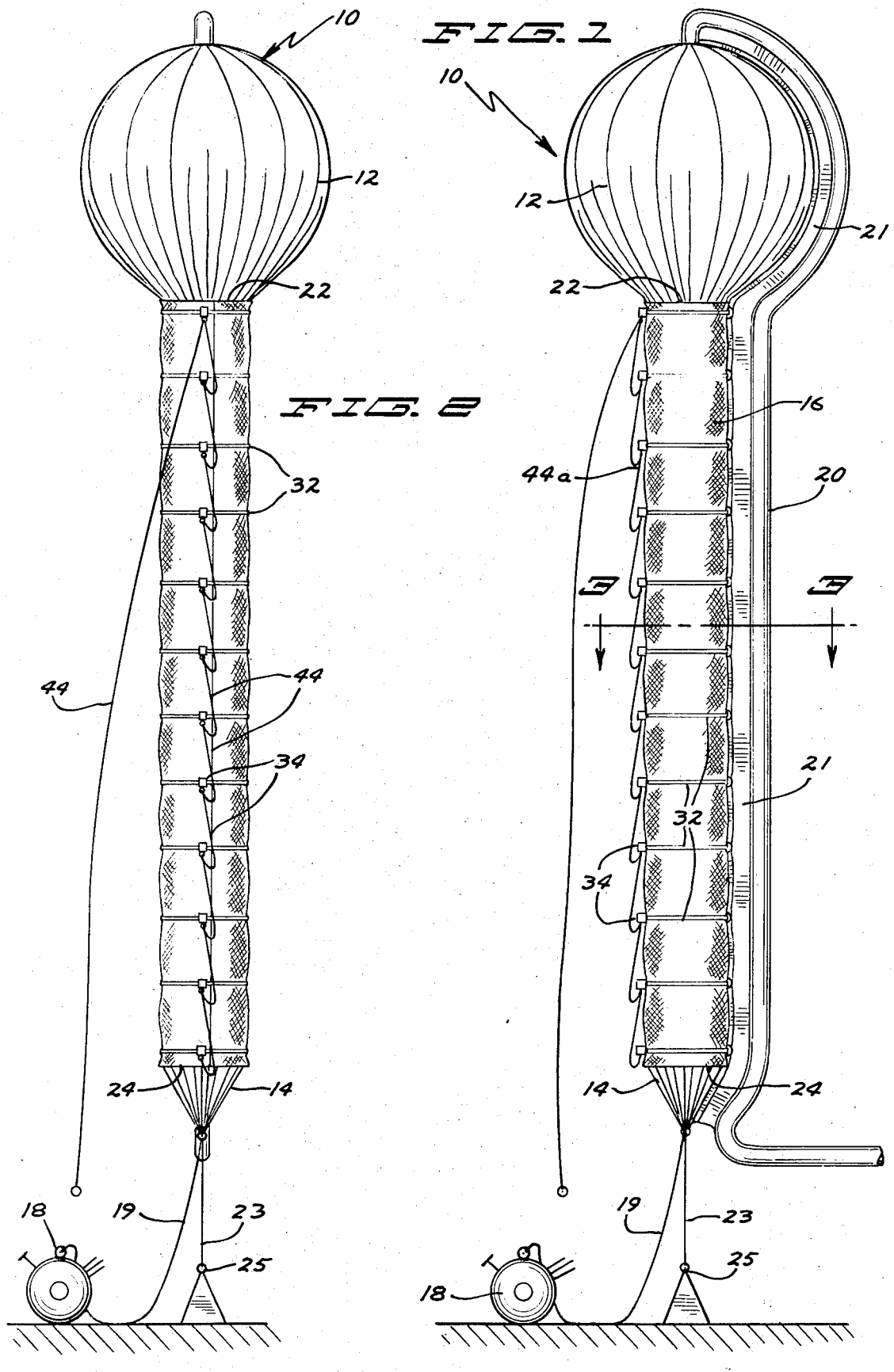

PATENTED JUN 4 1974 3,814,353
SHEET 2 OF 4
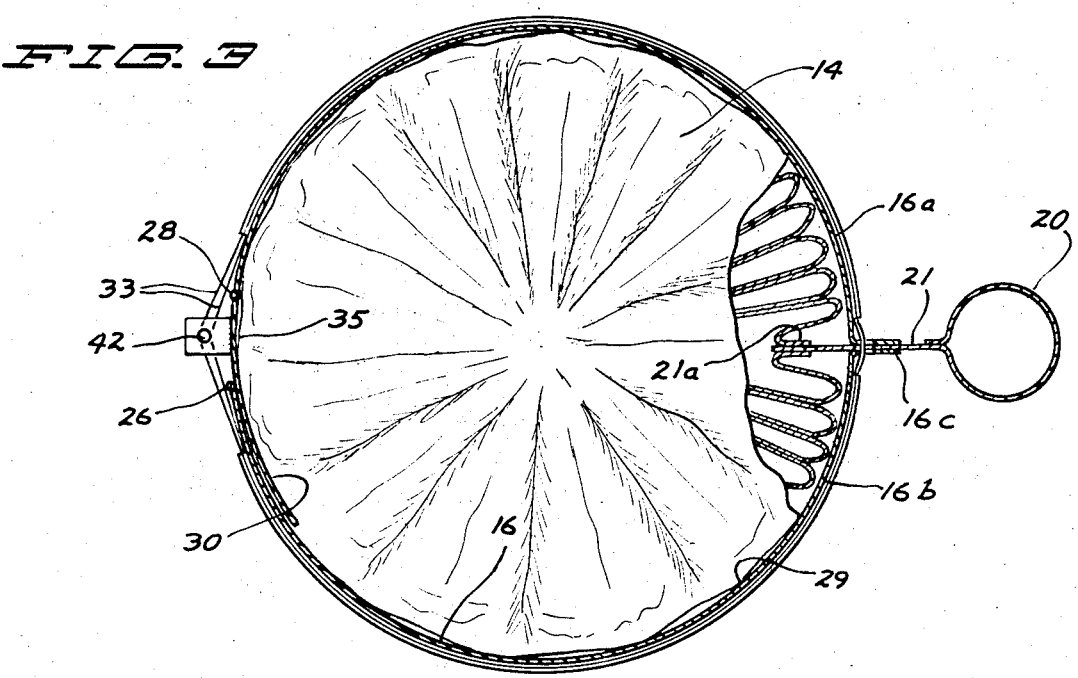
FIG. 3
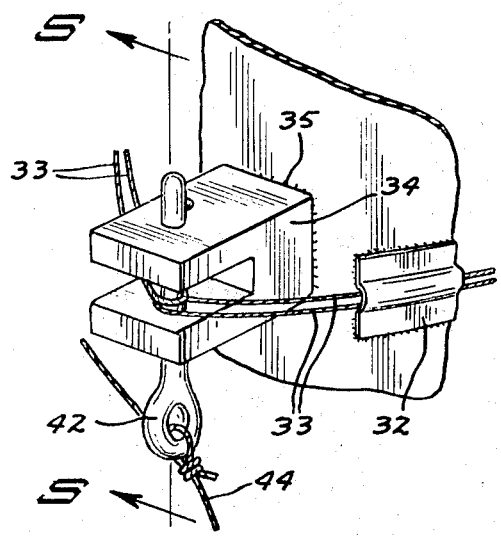
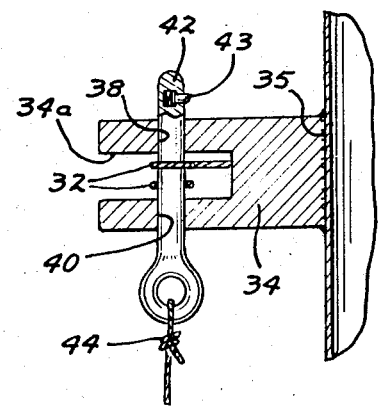
FIG. 5
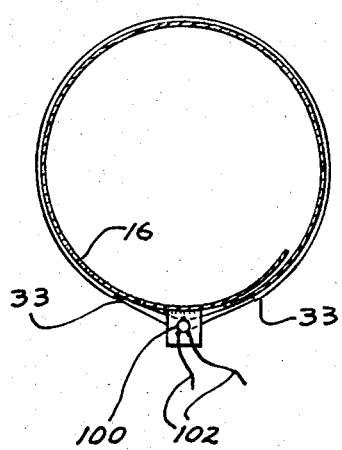
FIG. 4
FIG. 6

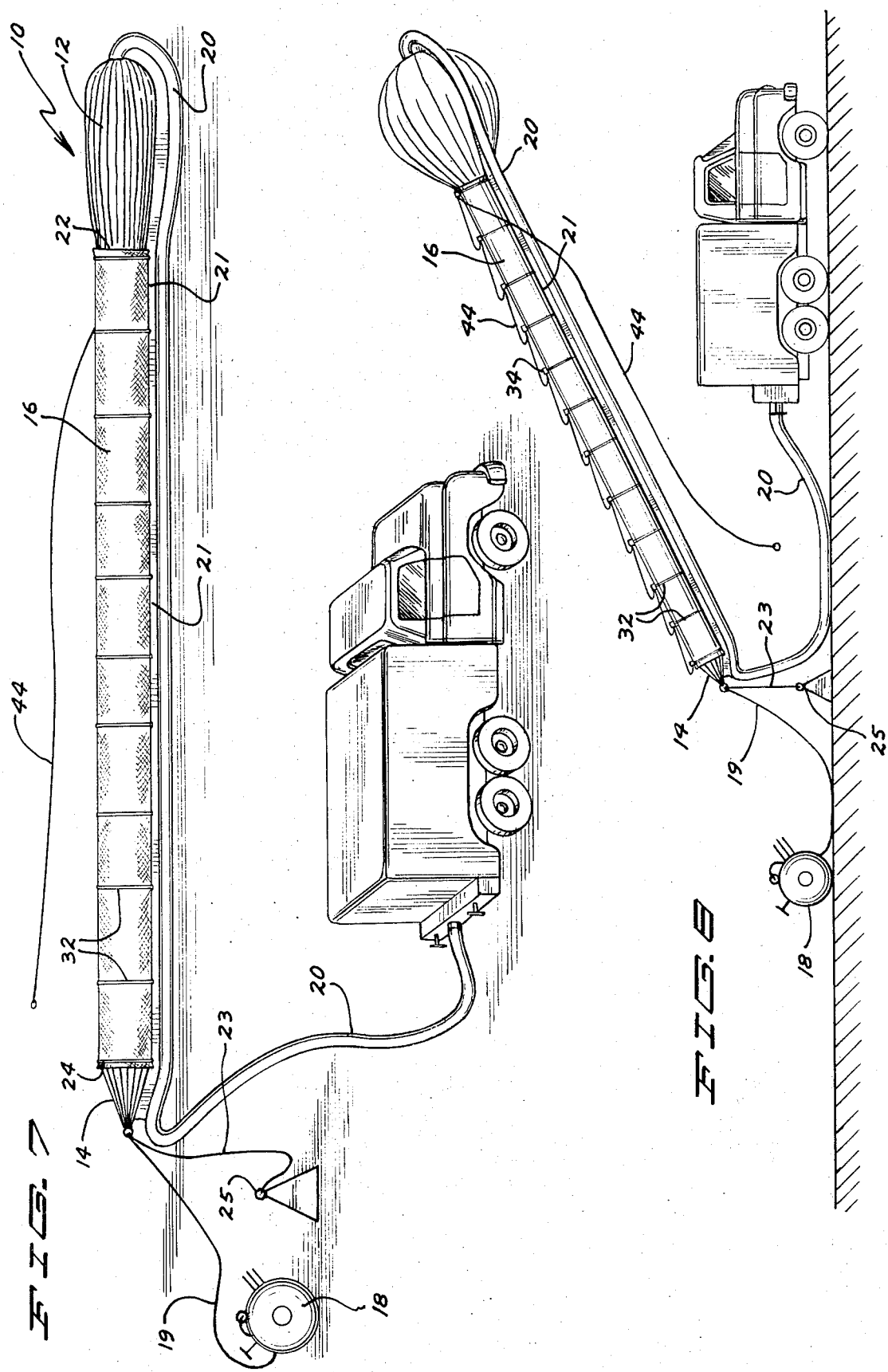

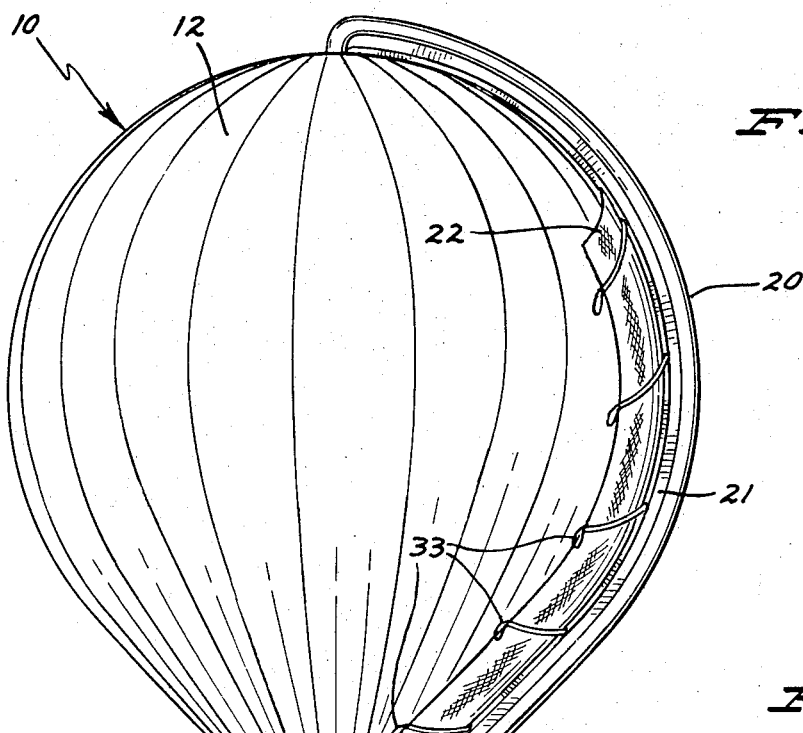
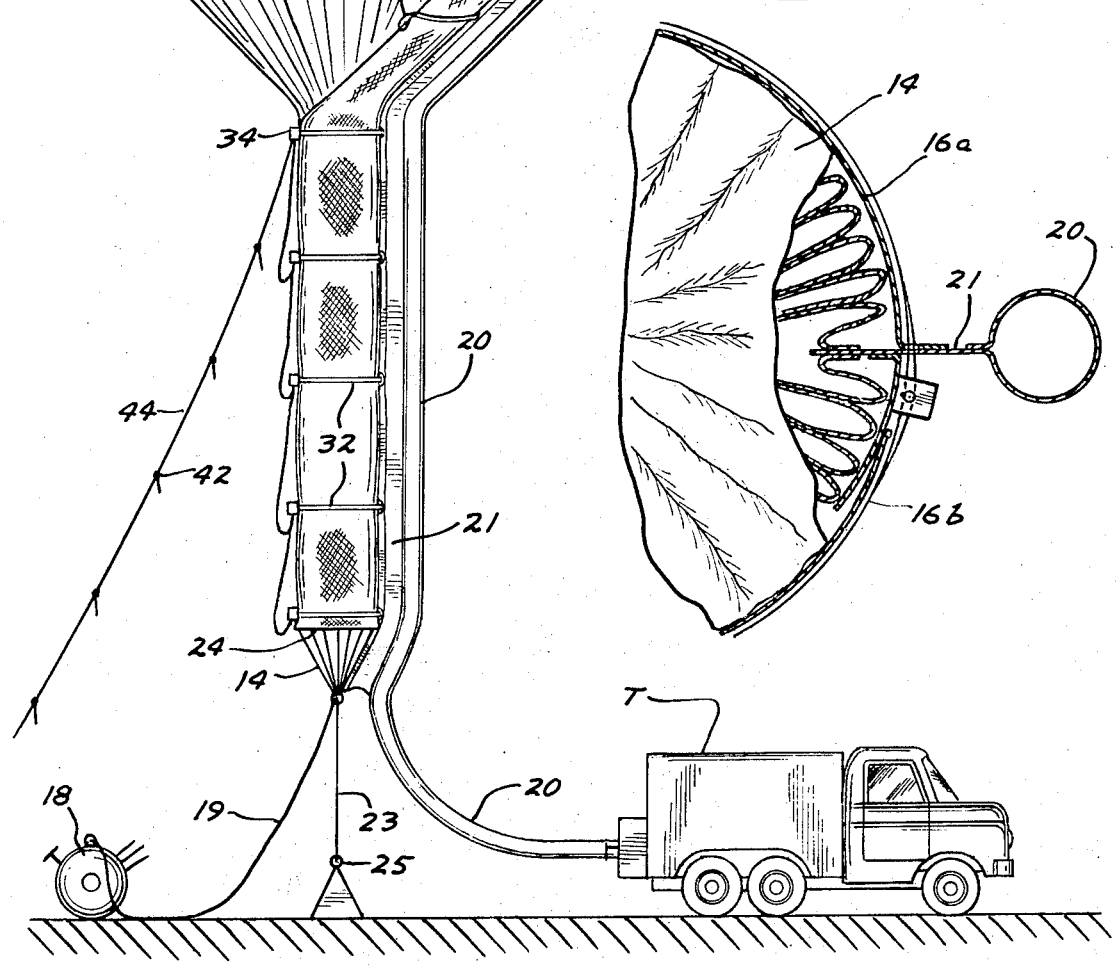

BALLOON REEFING SLEEVE AND LAUNCHING METHOD

FIELD OF THE INVENTION

The invention relates to high altitude balloons usually of relatively large size and to an improved method of filling and launching such balloons.

THE PRIOR ART

The problem of safely launching high altitude research balloons usually constructed from thin-walled plastic film and often having a length from about 300 – 500 feet has been a longstanding problem because the wind can buffet the balloon about or cause damage even at velocities as low as 10 or 15 miles an hour. For this reason, the launching is often done under windless conditions since in the process of filling the balloon, any wind is likely to catch the balloon which acting like a sail may be blown about and possibly damaged severely. Thus, balloons have usually been assembled in a horizontal position and attached to a roller winch usually a part of a carriage or cart which may or may not travel across the ground as the launch is carried out. A bubble of helium is placed at the top end of the balloon and is allowed to rise vertically at the end of a winch while the remaining portions, i.e., the lower portion of the envelope, is held in a horizontal position. This contributes many problems to a launch in addition to requiring a substantial amount of equipment. For example, in U.S. Pat. No. 2,954,187, issued Sept. 27, 1960, to O. C. Winzen, for Balloon and Method and Apparatus for Launching the Same, a launching method is described in which it is preferred to employ two trucks and a launching cart. While the patented method of launching a balloon is outstanding in some applications, it is undesirable in others and contributes certain problems to the launch. In addition to the requirement of two trucks and a launching cart, inflation is carried out from a source of gas which is located at or adjacent to the top of the balloon. Moreover, a stiffening ring of elaborate construction is required at the bottom of the balloon and a plurality of corsets are provided along the length of the balloon to restrict its diameter in selected spaced apart locations along its length. When the launch is carried out the appendix line which is attached to a winch is unreeled allowing the balloon to rise gradually while the payload is supported by the launching cart which positions itself automatically since it is on wheels beneath the balloon as the bubble elevates and, if needed, the launching cart is positioned manually or otherwise to maintain the load directly beneath the balloon load ring. An intermediate restraint is released first. A corset at the bottom of the balloon is released second and a choker which defines the lower aspect of the balloon bubble is released last.

Use of restraining corsets is described elsewhere in the literature for example, in the U.S. Pat. No. 3,093,351 for the purpose of confining a short section of the length of the balloon.

It has also been known to attempt to confine the balloon envelope along a greater portion of its length than that described in the patents by means of a longitudinally extending piece of material which is wrapped around the balloon envelope. These attempts, however, have been unacceptable because of the difficulty in reliably removing the piece of material as the bubble in the top of the balloon is increasing in size while helium is introduced.

THE OBJECTS

In view of these and other deficiencies of the prior art the present invention has the following characteristics, objects and advantages.

a. The provision of a balloon launching method which will allow the balloon to assume an erect position with less risk of damage in moderate winds, e.g., 10 to 15 miles an hour, by protecting the balloon along its entire length except for the topmost portion.

b. The provision of a balloon filling and launching method in which a greater degree of control is provided without the requirement for launching the balloon dynamically.

c. The elimination of the requirement for a large amount of equipment such as vehicles, carts and the like except for a single truck which is used to introduce lifting gas at the base of the balloon.

d. The avoidance of a requirement for retaining the top portion of the balloon on the ground during the filling operation whereby filling can be accomplished from a single point of attachment at the base of the balloon.

e. The provision of an improved arrangement for circumferentially restraining the diameter of the balloon envelope and for sequentially and progressively removing the restraint to effectively limit the amount of tension on the balloon envelope and thereby prevent tearing of the material.

f. A provision for providing a temporary lifting bubble at the top of the balloon with a restraining means for restricting the circumference of the portion between the bubble and the base and a reliable arrangement for controlling the angle assumed by the side wall of the balloon adjacent the top of the restraint to maintain it within predetermined limits.

g. The provision of a longitudinally extending reefing sleeve adapted to be opened sequentially and progressively from the top to the bottom with a provision for enabling inflation gas to be introduced from a point adjacent the base of the balloon and a further provision for preventing the reefing sleeve from interfering either with inflation pipe or the free expansion of the balloon envelope.

THE FIGURES

FIG. 1 is a side elevational view of the balloon embodying the invention after being erected to the vertical position but before being released.

FIG. 2 is a view similar to FIG. 1 as seen from the left side thereof.

FIG. 3 is a transverse cross sectional view taken on line 3—3 of FIG. 1 on a somewhat enlarged scale.

FIG. 4 is an isometric view of a reefing sleeve retaining block.

FIG. 5 is a vertical sectional view taken on line 5—5 of FIG. 4.

FIG. 6 is a transverse sectional view similar to FIG. 3 but showing a modified form of restraining cable release.

FIG. 7 is an isometric view of the balloon as it appears after being placed on the ground prior to being launched.

FIG. 8 is a side elevational view showing the balloon partially erected.

FIG. 9 is a view showing the balloon completely erected with the reefing sleeve partially released.

FIG. 10 is a transverse cross sectional view like that of FIG. 3, showing another embodiment of my invention.

SUMMARY OF THE INVENTION

A method is described for launching a balloon that may be of from about 300 – 500 feet in length in which the balloon is extended on the ground its full length and is restrained or restricted along its entire length, except for a portion near the top, to a substantially collapsed state. The circumference of the balloon in the restrained portion is sufficiently small so that the inflation gas will expand only the restricted portion of the bubble at the top of the balloon. The balloon is filled from the top with the bottom end anchored to the ground and is allowed, after the inflation gas has expanded the top portion, to define a lifting bubble for elevating the entire balloon to an erect or vertical position. The restraint on the circumference of the balloon is then released beginning from the top proceeding toward the bottom of the balloon as the inflation gas is introduced and in timed relationship with the introduction of the inflation gas so that the tension exerted upon the envelope of the balloon by the inflation gas will never exceed a predetermined limit during the filling operation and all of that portion of the balloon envelope below the expanding bubble will remain restricted to a substantially uninflated condition because of the continued circumferential restraint. The restrained portion is thus reduced in size proceeding downwardly until the entire balloon is inflated and is ready to be released from the ground.

The invention also provides a balloon construction including a balloon envelope with a reefing sleeve extending longitudinally thereof substantially the full length except for the top portion of the balloon. The sleeve is of sufficient width to enclose the balloon along its entire length below the exposed portion and includes a circumferentially extending restraining means to hold the enclosed portion of the balloon in an uninflated condition. Releasable fastener means are operatively connected to the restraining means to allow the balloon to be filled progressively from the top to the bottom while the restraining means remains in place and is effective to prevent expansion of the entire balloon envelope below the part which has been filled. A filling tube is preferably placed to extend from the top of the balloon to the base on the outside of the balloon and is suitably secured along its length to the side of the balloon. In a preferred form of the invention, the reefing sleeve is affixed to the balloon and remains in place after being released and during the time the balloon is in flight.

DESCRIPTION OF THE PREFERRED EMBODIMENT

The major components of the balloon will be described first. As best seen in FIG. 1, the balloon is designated generally by numeral 10. The balloon 10 is usually but not necessarily of a relatively large size as, for example, 300 – 700 (or more) feet in length and may be used, for example, for exploratory work in the stratosphere. Balloons of this kind are often referred to as high altitude research balloons.

The balloon is constructed of a lightweight, gas impervious envelope formed from a number of gores suitably welded together along their length in any suitable manner known in the art. After a limited amount of gas has been introduced into the balloon, as will be described fully below, there is defined at the upper portion of the balloon a lifting bubble 12 which functions during the initial stages of the launch to elevate the top of the balloon thereby raising the entire balloon from a horizontal position of FIG. 7 to the vertical position of FIGS. 1, 2 and 3.

The bottom of the envelope of the balloon terminates in a base portion 14 to which a load is attached. Extending substantially the full length of the balloon, escept for the top bubble portion 12 is a reefing sleeve 16 which consists of a generally rectangular sheet of fabric or the like. Reefing sleeve 16 extends longitudinally of the balloon envelope and before launch surrounds and encloses the envelope as shown in FIGS. 1 through 3 with the free longitudinally extending edges overlapped somewhat as will be described below. Below the balloon is a payload 18 which is secured in any suitable manner to base 14 of the balloon by a loadline 19.

Filling of the balloon is accomplished through an inflation pipe or duct 20 which extends from a source of gas, usually provided on the truck T at the base of the balloon, and thence extends upwardly or longitudinally from the base of the balloon to the top thereof and around to the outside of the lifting bubble 12 to the center of the top portion of the balloon where it communicates with the interior of the balloon. Inflation duct 20 is held in the desired position adjacent to but spaced slightly from the side wall of the balloon by a support element such as a laterally extending membrane 21 that connects the filling duct 21 to a gore panel junction on the balloon along the entire length thereof. Two adjacent gores of the balloon envelope are suitably sealed to each other and to the inner portion of the membrane as shown in 21a, usually by a welding process.

As can be best seen in FIG. 3, reefing sleeve 16 is composed of two parts, 16a and 16b, which for convenience will be referred to as left side portion 16a and right side portion 16b that includes marginal tabs which extend adjacent to and are suitably sealed, as by welding, to the membrane 21 at 16c. The top edge 22 of the reefing sleeve 16 will define the bottom edge of the temporary lifting bubble 12 as described more fully below. The bottom edge 24 of the reefing sleeve is spaced a short distance above base 14 of the balloon as seen in FIGS. 1 and 2. The connecting element, membrane 21, however, extends all the way to the base of the balloon as seen in FIGS. 1, 2 and 9. To provide additional strength, the longitudinally extending edges of the reefing sleeve 16 are provided with edge cords 26 and 28 (FIG. 3) which can be sewn or heat sealed into a hem. An overlap section of the reefing sleeve 16, preferably of high slip material, is designated at 30 in FIG. 3.

Thus, the reefing sleeve 16 may be fashioned into a cylinder enclosing almost the entire length of the balloon. The reefing sleeve includes an inner liner on its inward surface 29 which is composed preferably of a high slip material such as a slippery plastic film. At convenient intervals, or about three feet, along the length of the sleeve 16, a plurality of hems 32 are positioned to extend circumferentially. The hems are formed for example from woven nylon or other fabric sewn or heat sealed to the reefing sleeve 16 and each includes a circumferentially extending for receiving retaining cord 33 which extend entirely around the sleeve through the hems 32. Each cord is looped at its free end over a releasable retainer which will be described below.

A retaining supporting block 34 which can be formed, for example, from any rigid lightweight plastic resin, is provided with a central, horizontally extending slot 34a and a pair of vertically aligned bores 38 and 40 through which a releasing pin 42 is releasably secured in place by a detent 43. Block 34 is secured to the reefing sleeve 16 in any suitable manner as by adhesive 35. Thus, the pin 42 locks the cord ends in place so as to limit the diameter of the cylindrical reefing sleeve and maintain the enclosed portion of the balloon in a collapsed, substantially deflated condition.

Each of the pins 42, of which twelve are shown by way of example, is connected to a lanyard 44 that extends along the length of the sleeve between each of the pins. The topmost pin is connected to a section 44a of the lanyard which extends from the top of said pin to the ground so that tension on lanyard 44a will withdraw the first pin 42 from the sleeve thereby releasing the top cord 33 allowing the sleeve to partially open. Each succesive pin in this way is disengaged from the block 34. Release of each pin and cord 33 allows the reefing sleeve to fall back from the balloon so as to allow the lifting bubble 12 at the top of the balloon to increase in size in accordance with the amount of helium contained herein while the released portion of the sleeve 16 remains connected to web or membrane 21 and the balloon as clearly shown in FIG. 9. It will thus be seen that by pulling on lanyard 44a, the sleeve will be opened progressively as the pins are sequentially removed proceeding from the top of the sleeve to the bottom and it is this continuous and progressive opening of the sleeve along its entire length which has been found to be so effective in maximizing the amount of lift at any given moment while at the same time minimzing the area of the balloon envelope that is subject to buffeting by the wind. The balloon 10 is secured by a tie down line 23 to the ground at 25 or is in any other suitable way retained in place until it is ready to be cast off.

It can be seen that the balloon after achieving the vertical position is connected to the ground only at its base and filling tube 20 is also connected to the base. Moreover, a carriage is unnecessary for positioning the payload 18 beneath the balloon during the launch and a single vehicle T is normally all that is required to carry out the launch.

In FIG. 6 is shown a modified form of cord releasing means comprising an explosive squib 100 having conductors 102 which when suitably energized will cause the squib 100 to explode so as to release cord 33 and allow sleeve 16 to expand and open. One of the most suitable kinds of squib is a simple motor consisting of a bellows filled with powder and containing a suitable actuator to withdraw the pin from the block holder 34 when the powder explodes.

The pins 42 can be removed from the block 34 at any given location along the length of the reefing sleeve but normally will be removed in sequence proceeding from the top of the sleeve to the bottom. Since the filling tube 20 is physically attached by the membrane 21 to the balloon and the reefing sleeve itself, the reefing sleeve can be very easily retained on the balloon during flight and as a result the problems encountered in an attempt to control the released portion of the sleeve and the filling tube 20 is eliminated.

The balloon launching method disclosed in accordance with the present invention is adapted to allow the balloon to be safely laid or deployed on the ground and extended longitudinally its full length prior to being filled without danger of damaging the envelope of the balloon. A lifting bubble can be effectively formed at the top end of the balloon and the whole assembly of sleeve, balloon envelope and filling tube can be erected more safety to the vertical position without the use of the winch. Moreover, the tension or stretching force within the part of the balloon envelope that has been filled can be adequately controlled by observing the angle $\alpha$ between the side wall of the balloon just above the last pin which is in place with respect to the vertical. When the angle $\alpha$ becomes too great, another one of the pins can be removed thereby maintaining the tension on the balloon envelope within desired limits. The angle $\alpha$ may be selected in accordance with the characteristics of the material of which the balloon is constructed, however, an angle of $50° \pm 10°$ has proven to be adequate. The pin removal can be controlled manually from an observer on the ground or if desired can be controlled automatically, e.g., by exploding each explosive squib when the pressure within the bubble becomes too great.

In addition a maximum lifting force of the balloon can be attained at all times during the filling procedure while the unfilled portion of the balloon is maintained in a condition so as to minimize wind resistance while being protected at all points along its entire length by reefing sleeve 16.

In the embodiment of FIG. 10, the sleeve is constructed to provide a longitudinal discontinuity adjacent web or membrane 21 so that all of the operational elements concerning the filling of the balloon are in one specific location. Such elements may include one or more sets of lanyards for physically releasing the axially spaced apart loops 33 and a plurality of longitudinally extending electric cables connected to sources of energy on the ground or to altitude or attitude responsive sources of energy in or upon the balloon.

In one other specific example of the use of my invention, a balloon has been enclosed in a reefing sleeve, deployed on the ground, and the pins from selected spaced apart connectors manually removed so as to leave a number of equally spaced apart circumferentially extending loops and pins connected to a manually operated lanyard secured to release the remaining cords sequentially starting at the top of the balloon, as the bubble is filled.

As an alternative, the remaining loops may be released by dimple motors, electrical "line cutters" or the like, in a sequential manner in response to the shape of the bubble or the internal pressure. A number of loops near the bottom of the sleeve may be released by altitude responsive means such as baroswitches at appropriate intervals or altitudes during a flight.

Having now therefore fully illustrated and described my invention, what I claim to be new and desire to protect by Letters Patent is:

1. A method for launching a balloon which is subject to damage by the wind comprising extending the balloon longitudinally substantially its full length in a horizontal position, the top of the balloon being defined by one end and the base by the other end, restraining the diameter of the balloon substantially the full length thereof below a predetermined point near the top of the balloon nearby defining a temporary lifting bubble above said point to thereby restrict the volume of the balloon along the entire length of that part which is restrained to a substantially uninflated condition, introducing lifting gas into the balloon to form a bubble in the top portion to cause the balloon to be elevated from the horizontal position to a vertically disposed erect position with the base of the balloon adjacent the ground and progressively opening the restraining means beginning at the top thereof and proceeding to the bottom of the balloon in timed relationship with the introduction of gas into the balloon envelope to thereby regulate the degree of inflation of the balloon bubble and the top of the envelope at all times while maintaining at any moment the entire length of the balloon below the bubble in a restricted, substantially uninflated condition and thereafter releasing said balloon from the ground.

2. The method of claim 1 wherein the balloon is entirely filled and the restraint is released from the balloon at all points along its length prior to being released from the ground.

3. The method of claim 1 wherein the angle of the side walls of the balloon envelope with respect to the vertical is maintained within predetermined limits to maximize the size of the bubble without exceeding a predetermined tension on the balloon envelope.

4. The method of claim 1 wherein the restraining means is released progressively from the top thereof to the bottom in spaced apart increments along the length of the balloon.

5. The method of claim 1 wherein the angle of the side walls of the balloon envelope with respect to the vertical is maintained within predetermined limits to maximize the size of the bubble without exceeding a predetermined tension on the balloon envelope and the restraining means is released progressively from the top thereof to the bottom in spaced apart increments along the length of the balloon.

6. A balloon construction comprising in combination a balloon envelope formed from gas impervious sheet material, said balloon envelope having a top at one end and a base at the other end thereof, a reefing element extending from a point located somewhat below the top to substantially the base of the envelope, the reefing element restricting the diameter of the balloon below a certain value to limit the volume of the portion of the balloon enclosed thereby to a substantially uninflated condition, the unenclosed portion of the balloon envelope above the reefing defining a temporary lifting bubble for elevating the balloon from a horizontal extended position to a vertical position, and releasable fastener means on the reefing element for progressively allowing the reefing element to be opened from the top thereof proceeding downwardly toward the base of the balloon to restrain all portions of the balloon below the bubble by the reefing element to the uninflated condition and filling means communicatively connected to the balloon envelope.

7. The balloon of claim 6 wherein the reefing element is a fabric sleeve extending longitudinally of the balloon and having a rectangular configuration as seen when laid flat, the longitudinally extending edges thereof being overlapped and including said releasable fastener means thereon for retaining the overlapped edges of the sleeve in an overlapped condition and for progressively releasing said overlapped edges.

8. The balloon of claim 6 wherein the filling means comprises a filling tube extending longitudinally of the balloon and being secured thereto along substantially the entire length of the balloon and communicating with the balloon with the top thereof whereby a portion of the filling tube adjacent the base of the balloon can be supplied with a lifting gas that will enter the balloon at the top thereof.

9. The apparatus of claim 8 wherein the filling tube is secured to the balloon along substantially its entire length and remains attached thereto while the balloon is in flight.

10. The balloon according to claim 6 wherein the balloon envelope comprises an elongated, substantially gas impervious envelope and a reefing sleeve secured to the envelope along substantially the entire length thereof along a line running longitudinally of the balloon and includes a portion having a longitudinally extending marginal edge being positioned in overlapping relationship, longitudinally spaced apart circumferentially extending retaining elements enclosing the reefing sleeve and a locking means releasably securing the ends of the retaining elements together to thereby hold the sleeve and the balloon in turn in a collapsed condition and a means for successively and progressively removing the releasable locking means from the top of the sleeve to the end adjacent the base of the balloon whereby the sleeve opens progressively from the top of the balloon proceeding downwardly to the base thereof and the entire portion of the balloon below the last of the releasable locking means to be opened is retained in a substantially uninflated condition.

* * * * *